United States Patent
Nishimoto et al.

(10) Patent No.: US 10,466,930 B2
(45) Date of Patent: Nov. 5, 2019

(54) METHOD AND SYSTEM FOR FAST ORDERED WRITES WITH ATOMIC MULTICAST

(71) Applicant: EMC IP Holding Company LLC, Hopkinton, MA (US)

(72) Inventors: Michael Nishimoto, Saratoga, CA (US); Samir Rajadnya, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/581,580

(22) Filed: Apr. 28, 2017

(65) Prior Publication Data

US 2018/0314461 A1  Nov. 1, 2018

(51) Int. Cl.
*G06F 3/06* (2006.01)
*G06F 13/16* (2006.01)
*G06F 13/40* (2006.01)
*G06F 13/42* (2006.01)

(52) U.S. Cl.
CPC .......... *G06F 3/0659* (2013.01); *G06F 3/061* (2013.01); *G06F 3/0683* (2013.01); *G06F 13/1668* (2013.01); *G06F 13/4022* (2013.01); *G06F 13/4068* (2013.01); *G06F 13/4282* (2013.01)

(58) Field of Classification Search
CPC ........ G06F 3/0659; G06F 3/061; G06F 3/065; G06F 3/0683; G06F 13/1668; G06F 13/4022; G06F 13/4068; G06F 13/4282
See application file for complete search history.

(56) References Cited

U.S. PATENT DOCUMENTS

| | | |
|---|---|---|
| 5,708,668 A | 1/1998 | Styczinski |
| 6,351,838 B1 | 2/2002 | Amelia |
| 6,415,355 B1 | 7/2002 | Hirofuji |
| 7,398,418 B2 | 7/2008 | Soran et al. |
| 7,406,621 B2 | 7/2008 | Lubbers et al. |
| 7,430,706 B1 | 9/2008 | Yuan et al. |
| 7,543,100 B2 | 6/2009 | Singhal et al. |

(Continued)

FOREIGN PATENT DOCUMENTS

| | | |
|---|---|---|
| EP | 1577774 A2 | 9/2005 |
| JP | 2004-326759 A | 11/2004 |

(Continued)

OTHER PUBLICATIONS

Decision to Grant a Patent issued in corresponding Japanese Application No. 2015-501902, dated May 31, 2016 (6 pages).

(Continued)

*Primary Examiner* — Tim T Vo
*Assistant Examiner* — Harry Z Wang
(74) *Attorney, Agent, or Firm* — Chamberlain, Hrdlicka, White, Williams & Aughtry (57) ABSTRACT

In general, embodiments of the technology relate to a method and system for performing fast ordered writes in a storage appliance that includes multiple separate storage modules. More specifically, embodiments of the technology enable multicasting of data to multiple storage modules in a storage appliance, where the order in which the write requests are processed is the same across all storage modules in the storage appliance.

12 Claims, 7 Drawing Sheets

(56) References Cited

U.S. PATENT DOCUMENTS

| | | | |
|---|---|---|---|
| 7,644,197 B1* | 1/2010 | Waldorf | G06F 9/524 |
| | | | 710/105 |
| 7,752,389 B1 | 7/2010 | Fan | |
| 7,934,120 B2 | 4/2011 | Zohar et al. | |
| 8,078,906 B2 | 12/2011 | Yochai et al. | |
| 8,145,840 B2 | 3/2012 | Koul et al. | |
| 8,200,887 B2 | 6/2012 | Bennett | |
| 8,316,260 B1 | 11/2012 | Bonwick | |
| 8,327,185 B1 | 12/2012 | Bonwick | |
| 8,352,425 B2* | 1/2013 | Bourbonnais | G06F 16/23 |
| | | | 707/615 |
| 8,448,021 B1 | 5/2013 | Bonwick | |
| 8,464,095 B1 | 6/2013 | Bonwick | |
| 8,554,997 B1 | 10/2013 | Bonwick et al. | |
| 8,560,772 B1 | 10/2013 | Piszczek et al. | |
| 8,719,520 B1 | 5/2014 | Piszczek et al. | |
| 8,725,931 B1 | 5/2014 | Kang | |
| 8,924,776 B1 | 12/2014 | Mollov et al. | |
| 8,977,942 B2 | 3/2015 | Wu et al. | |
| 9,021,183 B2 | 4/2015 | Matsuyama et al. | |
| 9,152,499 B1 | 10/2015 | Mollov et al. | |
| 9,552,242 B1* | 1/2017 | Leshinsky | G06F 11/0727 |
| 9,760,493 B1 | 9/2017 | Wang | |
| 10,095,414 B2 | 10/2018 | Zettsu et al. | |
| 2002/0161972 A1 | 10/2002 | Talagala et al. | |
| 2003/0093740 A1 | 5/2003 | Stojanovic | |
| 2004/0153961 A1 | 8/2004 | Park et al. | |
| 2004/0177219 A1 | 9/2004 | Meehan et al. | |
| 2004/0225926 A1 | 11/2004 | Scales et al. | |
| 2005/0166083 A1 | 7/2005 | Frey et al. | |
| 2005/0223156 A1 | 10/2005 | Lubbers et al. | |
| 2005/0229023 A1 | 10/2005 | Lubbers et al. | |
| 2006/0085594 A1 | 4/2006 | Roberson et al. | |
| 2006/0112261 A1 | 5/2006 | Yourst et al. | |
| 2006/0190243 A1* | 8/2006 | Barkai | G06F 16/278 |
| | | | 704/8 |
| 2007/0061383 A1 | 3/2007 | Ozawa et al. | |
| 2008/0109602 A1 | 5/2008 | Ananthamurthy et al. | |
| 2008/0120484 A1* | 5/2008 | Zhang | G06F 9/466 |
| | | | 711/163 |
| 2008/0168225 A1 | 7/2008 | O'Connor | |
| 2009/0187786 A1 | 7/2009 | Jones et al. | |
| 2010/0005364 A1 | 1/2010 | Higurashi et al. | |
| 2010/0082540 A1 | 4/2010 | Isaacson et al. | |
| 2010/0199125 A1 | 8/2010 | Reche | |
| 2011/0055455 A1 | 3/2011 | Post et al. | |
| 2011/0258347 A1 | 10/2011 | Moreira et al. | |
| 2012/0030425 A1 | 2/2012 | Becker-Szendy et al. | |
| 2012/0079318 A1 | 3/2012 | Colgrove et al. | |
| 2012/0089778 A1 | 4/2012 | Au et al. | |
| 2012/0166712 A1 | 6/2012 | Lary | |
| 2012/0297118 A1 | 11/2012 | Gorobets et al. | |
| 2012/0303576 A1 | 11/2012 | Calder et al. | |
| 2012/0324156 A1 | 12/2012 | Muralimanohar et al. | |
| 2013/0151754 A1 | 6/2013 | Post et al. | |
| 2015/0324387 A1* | 11/2015 | Squires | H04L 67/1097 |
| | | | 707/827 |
| 2016/0132432 A1 | 5/2016 | Shen et al. | |
| 2016/0210060 A1 | 7/2016 | Dreyer | |
| 2016/0320986 A1 | 11/2016 | Bonwick | |
| 2017/0192889 A1 | 7/2017 | Sato et al. | |
| 2017/0255405 A1 | 9/2017 | Zettsu et al. | |
| 2017/0285945 A1 | 10/2017 | Kryvaltsevich | |
| 2017/0300249 A1 | 10/2017 | Geml et al. | |
| 2017/0329675 A1 | 11/2017 | Berger et al. | |
| 2017/0351604 A1 | 12/2017 | Tang et al. | |
| 2018/0267897 A1 | 9/2018 | Jeong | |

FOREIGN PATENT DOCUMENTS

| | | |
|---|---|---|
| JP | 2010-508604 A | 3/2010 |
| WO | 2008/054760 A2 | 5/2008 |

OTHER PUBLICATIONS

Minoru Uehara; "Orthogonal RAID with Multiple Parties in Virtual Large-Scale Disks"; IPSJ SIG Technical Report; vol. 2011-DPS-149; No. 4; Nov. 24, 2011 (8 pages).

H. Peter Anvin; "The mathematics of RAID-6"; http://kernel.org/pub/linux/kernel/people/hpa/raid6.pdf (last visited Nov. 15, 2017) (9 pages).

Amber Huffman; "NVM Express: Revision 1.0b"; Jul. 12, 2011 (126 pages).

Akber Kazmi; "PCI Express™ Basics & Applications in Communication Systems"; PCI-SIG Developers Conference; 2004 (50 pages).

Derek Percival; "Multicast Over PCI Express®," PCI-SIG Developers Conference Europe; 2009 (33 pages).

Jack Regula; "Using Non-transparent Bridging in PCI Express Systems"; PLX Technology, Inc.; Jun. 1, 2004 (31 pages).

Extended European Search Report issued in corresponding EP 18178864.7, dated Oct. 9, 2018. (7 pages).

Definition: time slice: IBM knowledgebase, "Scheduler Processor Time Slice", retrieved on-line at http://www.ibm.com/support/knowledgecenter/en/ssw_aix_72/com.ibm.aix.performance/sched_proc_time_slice.htm, retrieved on Jun. 11, 2019 (2 pages).

Definition: time slice: Microsoft computer dictionary, Fifth Edition. p. 656, 2015 Safari Books Online, LLC., (1 page).

Definition: time slice: Wikipedia: retrieved on-line at https://en.wikipedia.org/wiki/Preemtion_(computing), on Jul. 11, 2019. (3 pages).

* cited by examiner

METHOD AND SYSTEM FOR FAST ORDERED WRITES WITH ATOMIC MULTICAST

BACKGROUND

Storage appliances include storage media and provide a mechanism to enable clients to write data to and to read data from the storage media.

BRIEF DESCRIPTION OF DRAWINGS

FIGS. 2-4B show flowcharts in accordance with one or more embodiments of the technology.

DETAILED DESCRIPTION

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-4B, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to a method and system for performing fast ordered writes in a storage appliance that includes multiple separate storage modules. More specifically, embodiments of the technology enable multicasting of data to multiple storage modules in a storage appliance, where the order in which the write requests are processed is the same across all storage modules in the storage appliance. Embodiments of the technology enable the aforementioned ordering without requiring the clients to coordinate the writing of data to the storage appliance. In particular, embodiments of the technology enforce ordering of write requests using a fabric (e.g., a PCIe fabric) in combination with storage modules that include global submission queues (see e.g., FIG. 4A) or per-client submission queues (see e.g., FIG. 4B).

In one embodiment of the technology, the ordering is consistent across the storage modules in the storage modules such that the data stored in the individual storage modules (or a subset of the storage modules) is the same. For example, consider a scenario in which the storage appliance includes three storage modules (1, 2, 3). Further, assume that client A issues a first write request (A) specifying an object and offset and Client B issues a second write request (B) specifying the same object and offset. Embodiments of the technology ensure that the write requests (A, B) are processed in the same order on each of the storage modules such that after both write requests have been processed on the three storage modules (1, 2, 3), the data stored for the specific object and offset is the same on each of the three storage modules (1, 2, 3).

Figure 1A:
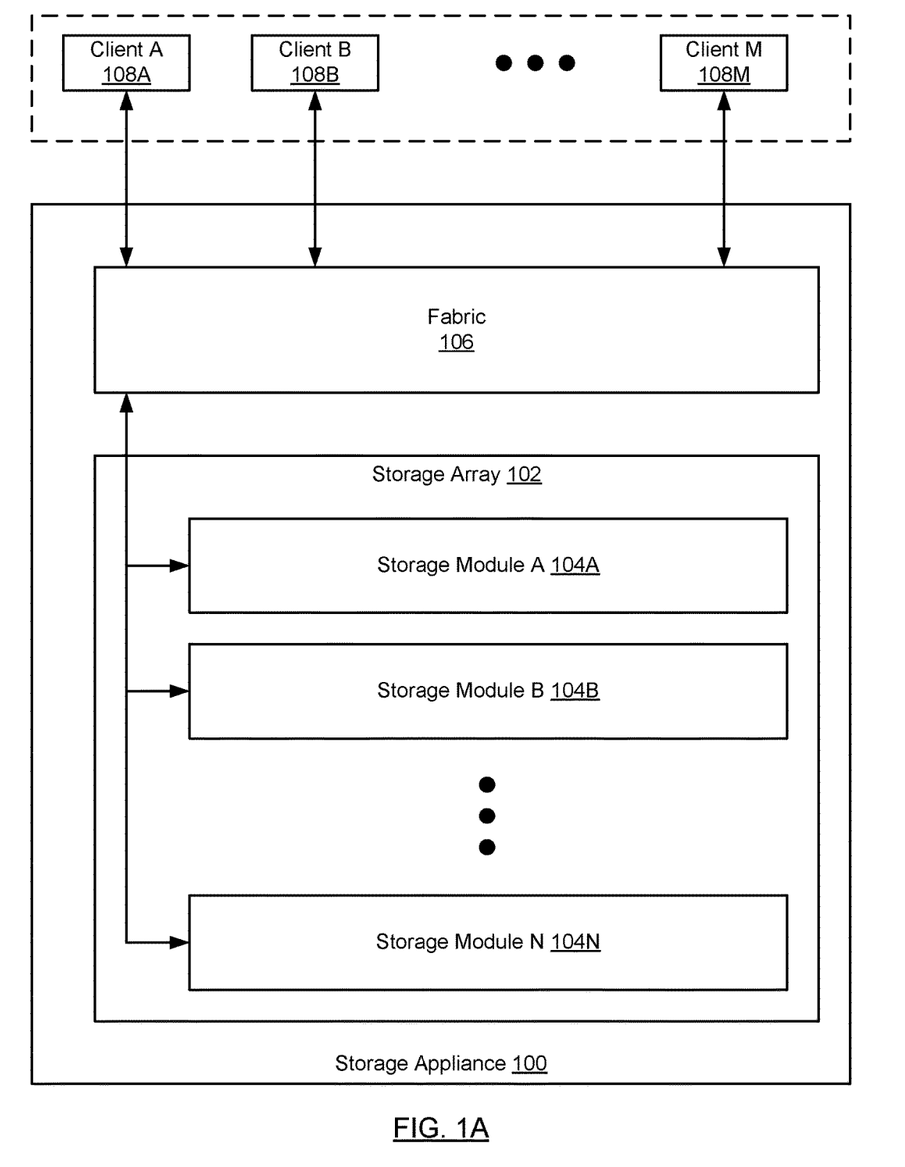
FIGS. 1A-1C show systems in accordance with one or more embodiments of the technology.

FIG. 1A shows a system in accordance with one or more embodiments of the technology. Referring to FIG. 1A, the system includes one or more clients (client A (108A)-client M (108M)) that are operatively connected to a storage appliance (100).

In one embodiment of the technology, the clients (108A-108M) may be any type of physical system that includes functionality to issue a read request to the storage appliance (100) and/or to issue a write request to the storage appliance (100). Though not shown in FIG. 1A, each of the clients (108A-108M) may include a client processor (not shown), client memory (not shown), and any other software and/or hardware necessary to implement one or more embodiments of the technology.

In one embodiment of the technology, the clients (108A-108M) are configured to execute an operating system (OS) that includes a file system. The file system provides a mechanism for the storage and retrieval of files from the storage appliance (100). More specifically, the file system includes functionality to perform the necessary actions to issue read requests and write requests to the storage appliance (100). The file system may also provide programming interfaces to enable the creation and deletion of files, reading and writing of files, performing seeks within a file, creating and deleting directories, managing directory contents, etc. In addition, the file system also provides management interfaces to create and delete file systems. In one embodiment of the technology, to access a file, the operating system (via the file system) typically provides file manipulation interfaces to open, close, read, and write the data within each file and/or to manipulate the corresponding metadata. In another embodiment of the technology, the client is configured to execute a block driver that is used to access the storage appliance. In another embodiment of the technology, the client is configured to execute an application programming interface (API) that enables the client to access the storage appliance.

In one embodiment of the technology, the clients (108A-108M) interface with the fabric (106) of the storage appliance (100) to communicate with the storage appliance (100), as further described below in FIG. 2.

In one embodiment of the technology, the storage appliance (100) is a system that includes persistent storage, and is configured to service read requests and/or write requests from one or more clients (108A-108M).

The storage appliance (100), in accordance with one or more embodiments of the technology, includes one or more storage modules (104A-104N) organized in a storage array (102) and a fabric (106) that interfaces the storage module(s)

(104A-104N) with the clients (108A-108M). Each of these components is described below.

The storage array (106), in accordance with an embodiment of the technology, accommodates one or more storage modules (104A-104N). The storage array may enable a modular configuration of the storage appliance, where storage modules may be added to or removed from the storage appliance (100), as needed or desired. A storage module (104), in accordance with an embodiment of the technology, is described below, with reference to FIG. 1C.

Continuing with the discussion of the storage appliance (100), the storage appliance includes the fabric (106). The fabric (106) may provide physical connectivity between the clients (108A-108M) and the storage module(s) (104A-104N) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols. A fabric (106) in accordance with an embodiment of the technology, is described below, with reference to FIG. 1B.

Figure 1B:
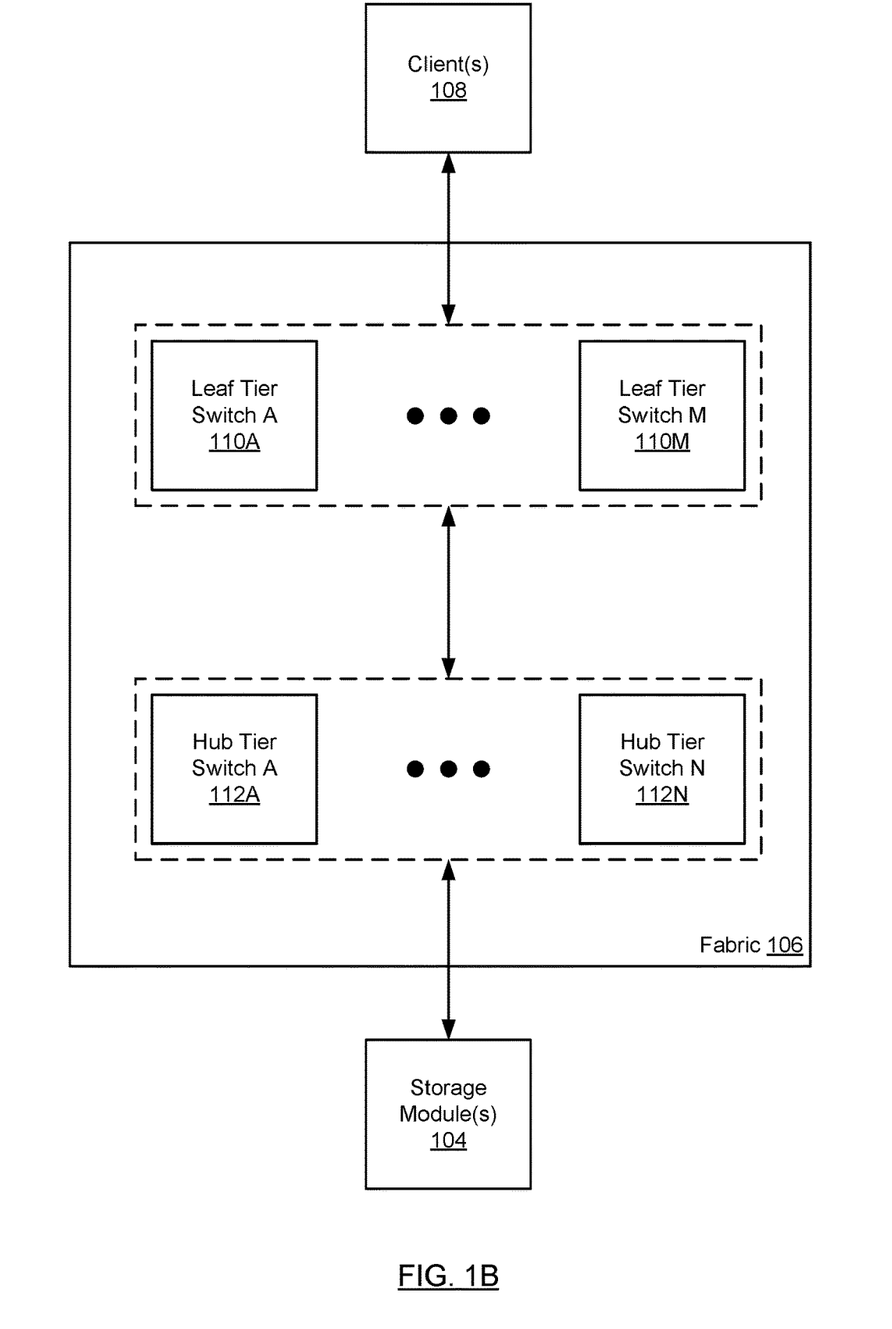

FIG. 1B shows a fabric in accordance with one or more embodiments of the technology. The fabric (106) includes one or more leaf tier switches (110A, 110M) and one or more hub tier switches (112A, 112N). Each of these components is described below.

With respect to the leaf tier switches (110A, 110M), each leaf tier switch is a physical PCIe switch that is connected to one or more clients (108) and each client (108) may be connected to one or more leaf tier switches. Each leaf tier switch is also connected to one or more hub tier switches. In one embodiment of the technology, each leaf tier switch is connected to every hub tier switch in the fabric resulting in a fully connected mesh between the tiers in the fabric. Embodiments of the technology may be implemented without a fully connected mesh between the tiers without departing from the technology.

In one embodiment of the technology, each leaf tier switch is configured to: (i) receive transaction layer packets (TLPs) from the clients with which it is connected and route the TLPs to the appropriate hub tier switch using address routing and (ii) receive TLPs from one or more hub tier switches to which the leaf tier switch is connected and route the TLPs to the appropriate client using address routing.

With respect to the hub tier switches (112A-112N), each hub tier switch is a physical PCIe switch that is connected to one or more leaf tier switches (110A-110M) and to one or more storage modules (104). Further, each storage module may be connected to one or more hub tier switches. In one embodiment of the technology, each hub tier switch is connected to every other leaf tier switch in the fabric resulting in a fully connected mesh between the tiers in the fabric. Embodiments of the technology may be implemented without a fully-connected mesh between the tiers without departing from the technology.

In one embodiment of the technology, each hub tier switch is configured to: (i) receive TLPs from the storage modules (104) with which it is connected and route the TLPs to the appropriate leaf tier switch using address routing and (ii) receive TLPs from one or more leaf tier switches to which the hub tier switch is connected and route the TLPs to the appropriate storage modules (104) using address routing.

In addition, one or more hub tier switches are configured to generate multiple TLPs in response to receiving a single TLP from a leaf tier switch. For example, a client (108) may generate and send a TLP that includes a multicast address to a leaf tier switch. The leaf tier switch evaluates the multicast address and routes, based on the evaluation, the TLP to a hub tier switch. The hub tier switch subsequently receives the TLP and evaluates the address, which based on the evaluation, is identified as a multicast address. Based on the evaluation, N number of TLPs are generated. Each of the N number of TLPs is then transmitted to a different storage module.

In one embodiment of the technology, the fabric may concurrently receive TLPs from multiple clients. However, the fabric serializes the transmission to the storage modules. More specifically, in one embodiment of the technology, each hub tier switch serializes the processing of TLPs it receives from the various clients. As a result, the hub tier switch also serializes the transmission of TLPs to the storage modules. In this manner, hub tier switch ensures that the TLPs it issues to each storage module are issued in the same order.

Figure 3:
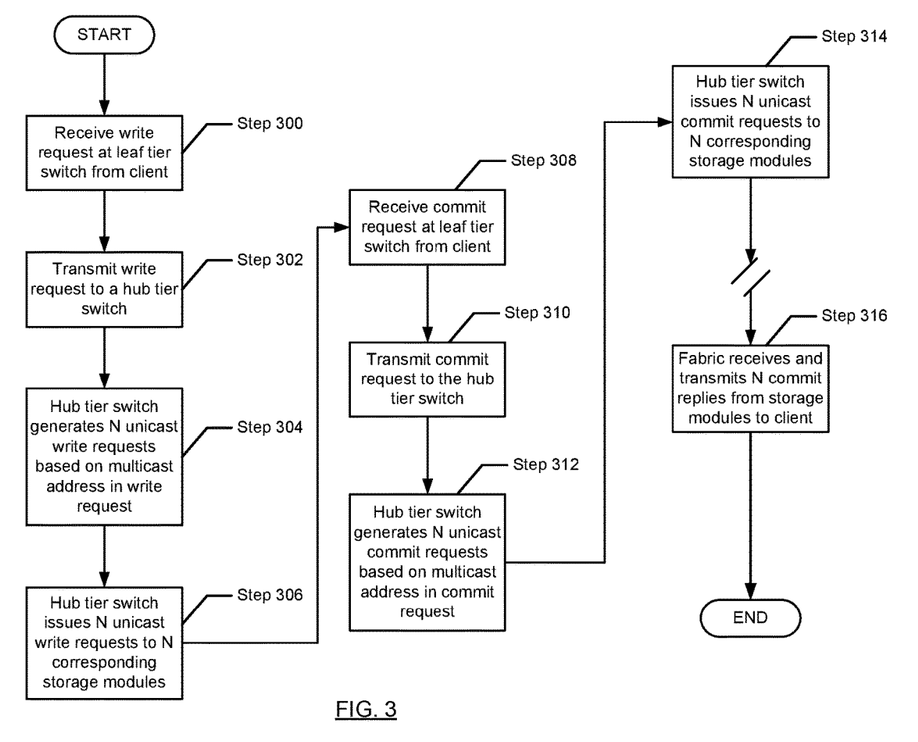

In one embodiment of the technology, the fabric is configured to perform all or a portion of the methods shown in FIG. 3.

Figure 1C:
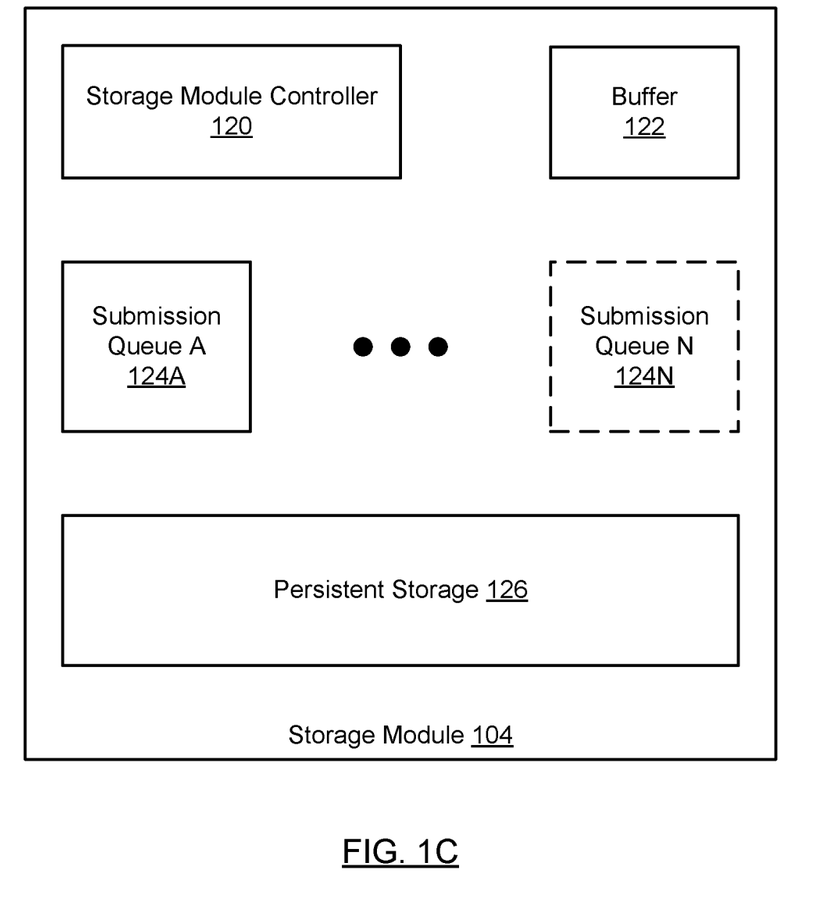

FIG. 1C shows a storage module (104), in accordance with one or more embodiments of the technology. The storage module (104) includes a storage module controller (120), a buffer (122), one or more submission queues (124A, 104N), and persistent storage (126). Each of these components is described below.

In one embodiment of the technology, the storage module controller (120) is configured to receive and service requests to read from and/or write data to the persistent storage (122). These requests may originate from the clients (108) and may be conveyed to the storage module controller (120) via the fabric (106). Further, the storage module controller (124) may be programmed to, or otherwise configured to, perform all or a portion of the methods shown in FIGS. 4A and 4B.

Figure 4A:
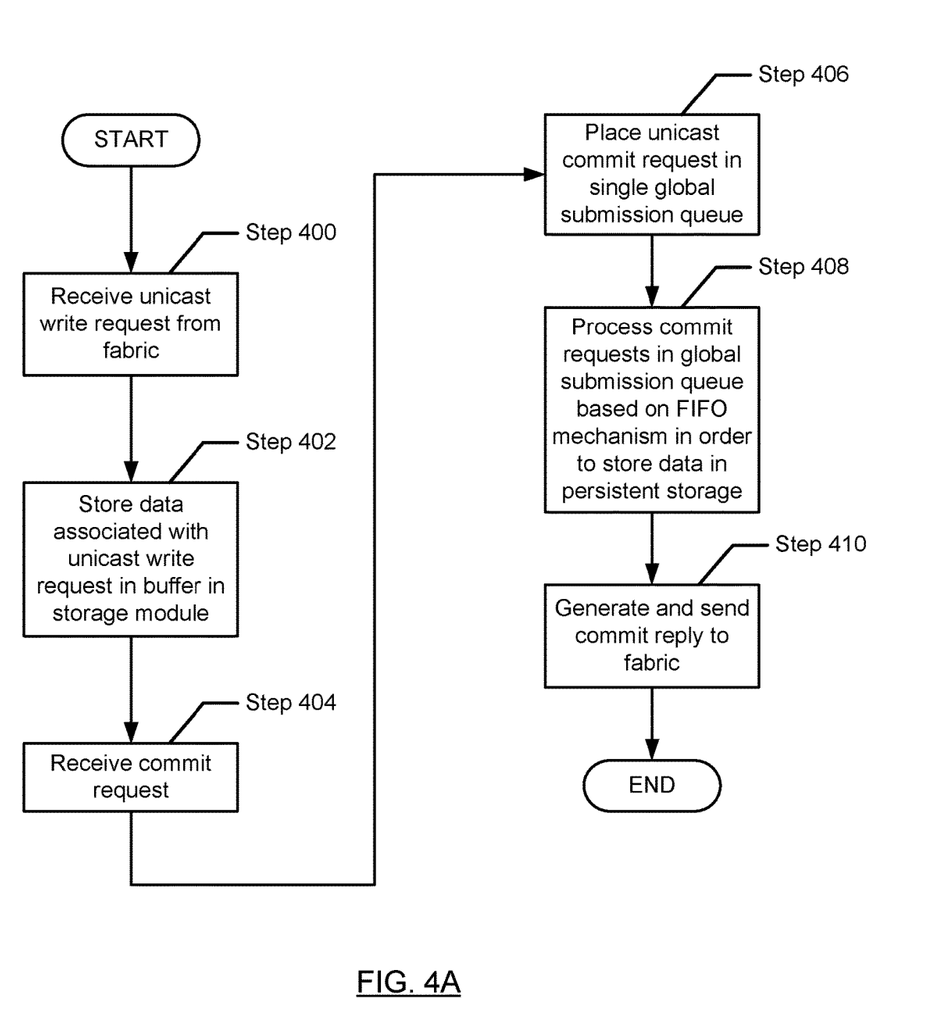
Figure 4B:
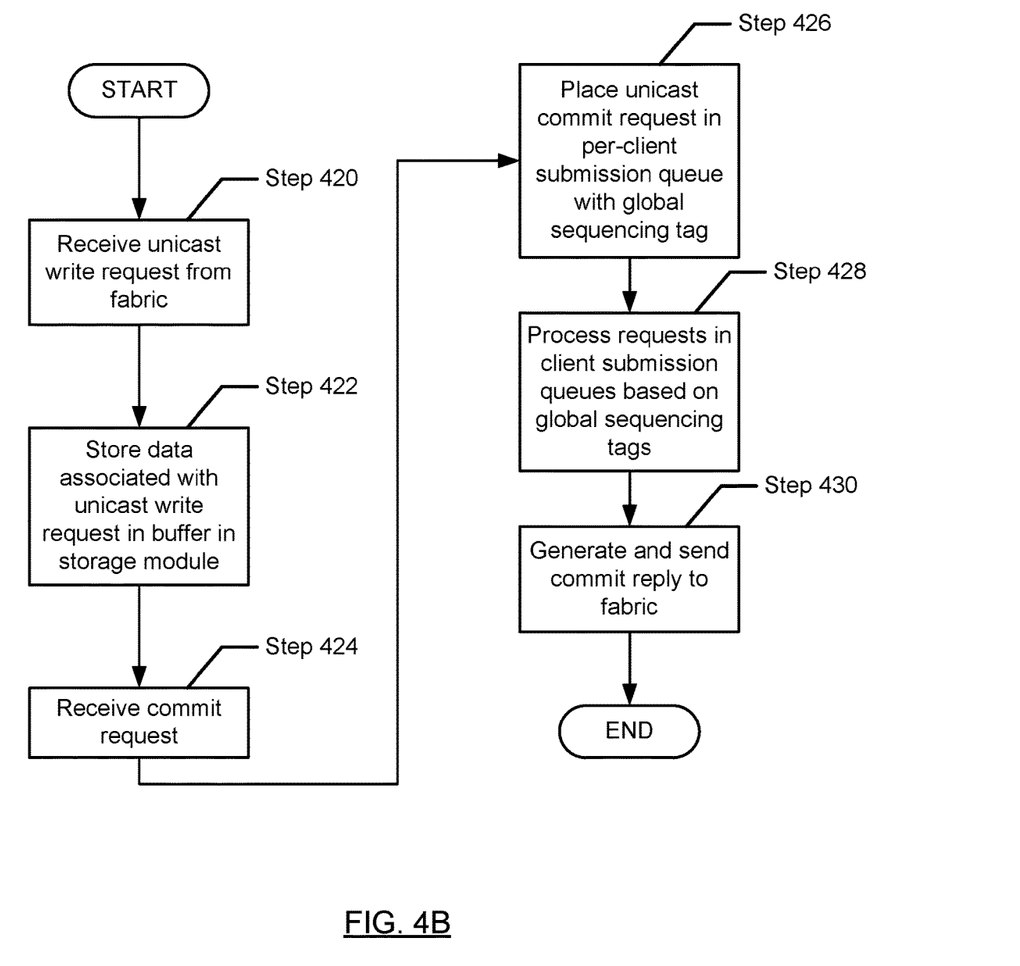

In one embodiment of the technology, the storage module controller (120) includes a processor (not shown) (e.g., one or more cores, or micro-cores of a processor that are configured to execute instructions), one or more hardware registers (not shown), and memory (shown) (e.g., volatile memory that may be, but is not limited to, dynamic random-access memory (DRAM), synchronous DRAM, SDR SDRAM, and DDR SDRAM) to perform all or a portion of the method described in FIGS. 4A and/or 4B. Alternatively, the storage module controller (120) may be implemented using a field-programmable gate array (FPGA) and/or an application-specific integrated circuit (ASIC).

In one embodiment of the technology, the persistent storage (126) of the storage module (104) may include, but is not limited to, Spin-Torque Magnetic RAM (ST-MRAM), Phase Change Memory (PCM), NAND Flash memory and NOR Flash memory. Those skilled in the art will appreciate that the technology is not limited to aforementioned types of persistent storage.

In one embodiment of the technology, the buffer (122) is volatile memory that temporarily stores data received by the storage module prior to the data being stored in the persistent storage.

In one embodiment of the technology, the storage module may include one or more submission queues (124A, 124N). The submission queues store commit requests in the order in which they are received by the storage module. In one embodiment of the technology, the storage module includes a single global submission queue in which all commit requests received from all clients are stored. In another embodiment of the technology, the storage module includes a set of submission queues, where each submission queue only stores commit requests received from a specific client.

One skilled in the art will recognize that the architecture of the system is not limited to the components shown in FIGS. 1A-1C. For example, the components of the storage appliance (100) may include any number of storage modules (104A-104N). Further, the storage module controller (120) of the storage module (104) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology.

FIGS. 2-4A show flowcharts in accordance with one or more embodiments of the technology. While the various steps in the flowchart are presented and described sequentially, one of ordinary skill in the art will appreciate that some or all of the steps may be executed in different orders, may be combined or omitted, and some or all of the steps may be executed in parallel. In one embodiment of the technology, each of the steps shown in FIGS. 2-4A may be performed in parallel with any of the other steps shown in FIGS. 2-4A.

Figure 2:
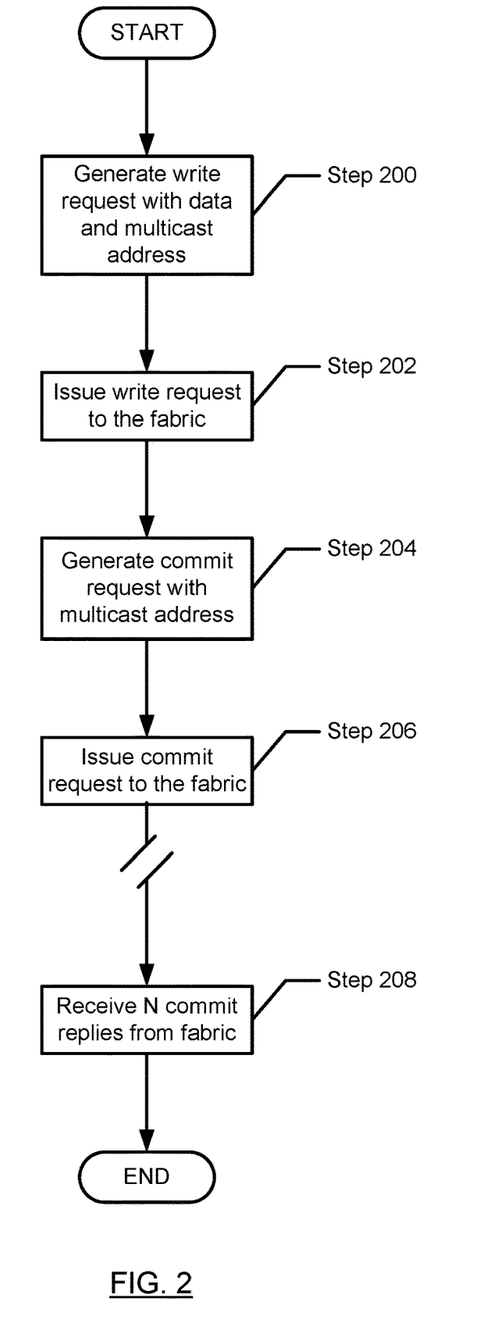

FIG. 2 shows a method for writing data to the storage modules from the perspective of a client in accordance with one or more embodiments of the technology.

In Step 200, a client generates a write request that includes an address and data. The address included in the write request may be a multicast address. More specifically, the address may appear, from the perspective of the client, as any other address; however, when this address is evaluated by the fabric, it results in the generation of N number of write requests (see e.g., FIG. 3, step 304).

In Step 202, the write request is issued by the client to the fabric. If the fabric is a PCIe fabric (i.e., a fabric that implements PCIe), then the write request may be issued using one or more TLPs.

In Step 204, the client generates a commit request which includes a multicast address (i.e., the same address that was included in the write request generated in Step 200). While the write request includes the data to be transmitted, the commit request includes the command which results in the data being stored in the persistent storage (see e.g., FIGS. 4A, 4B).

In Step 206, the commit request is issued by the client to the fabric. If the fabric is a PCIe fabric (i.e., a fabric that implements PCIe), then the commit request may be issued using one or more TLPs.

At some later point in time, in Step 208, the client receives N commit replies. More specifically, because the client issued a write request and a commit request with a multicast address, N number of copies of the data will be written to the storage array. For each copy of the data written to the storage array, the fabric will receive a commit reply (see e.g., FIG. 3, Step 316). Each time a commit reply is received by the fabric it is transmitted to the client that issued the commit request. The client will continue to receive commit replies associated with a given commit request until it has received N commit replies (assuming that the commit requests were successfully processed by the individual storage modules and the fabric remains operational).

FIG. 3 shows a method for writing data to the storage modules from the perspective of the fabric in accordance with one or more embodiments of the technology.

In Step 300, a write request that includes data and a multicast address is received by a leaf switch in the fabric. If the fabric is a PCIe fabric, then the write request may be received as one or a set of TLPs.

In Step 302, the leaf switch processes the write request. More specifically, the processing of the write request includes evaluating the address in the write request to identify a hub tier switch (or an egress port operatively connected to the hub tier switch). The result of the processing is the transmission of the write request to a hub tier switch. In one embodiment of the technology, a specific hub tier switch processes all write requests for a given multicast address. For example, all write requests received by the fabric that include address A are routed to hub tier switch A.

In Step 304, in response to receiving the write request, the hub tier switch processes the write request. The processing of the write request includes determining that the address in the write request is a multicast address and, in response to this determination, generating N number of write requests. The specific number (N) of write requests generated is pre-configured on the hub tier switch. In one embodiment of the technology, each of the generated write requests includes a unicast address.

In Step 306, the generated write requests (i.e., the write requests generated in step 304) are transmitted to the storage modules. More specifically, each of the N write requests is transmitted to a different storage module in the storage appliance.

In Step 308, a commit request that includes the multicast address is received by a leaf switch in the fabric. If the fabric is a PCIe fabric, then the commit request may be received as one or a series of TLPs.

In Step 310, the leaf switch processes the commit request. More specifically, the processing of the commit request includes evaluating the address in the commit request to identify a hub tier switch (or an egress port operatively connected to the hub tier switch). The result of the processing is the transmission of the commit request to a hub tier switch (i.e., the hub tier switch to which the write request in step 302 was sent).

In Step 312, in response to receiving the commit request, the hub tier switch processes the commit request. The processing of the commit request includes determining that the address in the commit request is a multicast address and, in response to this determination, generating N number of commit requests. The specific number (N) of commit requests generated is pre-configured on the hub tier switch. In one embodiment of the technology, each of the generated commit requests includes a unicast address.

In Step 314, the generated commit requests (i.e., the commit requests generated in step 312) are transmitted to the storage modules (i.e., to the same storage modules to which the write requests were sent in Step 306). More specifically, each of the N commit requests is transmitted to one of N a storage modules in the storage appliance, where a commit request is received by each of the storage modules after the corresponding write request is received by the storage module.

In one embodiment of the technology, a specific hub switch receives all commit requests associated with a specific multicast address. The order in which the hub switch receives commit requests for a specific multicast address is maintained such that the N commit requests generated in step 312 are generated in the same order to all target storage modules.

For example, consider a scenario in which there are two clients (C1, C2) and three storage modules (SM 1, SM 2, SM 3). In this scenario, C1 may issue a first commit request (CR1) that includes an address and C2 may issue a second commit request (CR2) that includes the same address. As discussed above, both of these commit requests will be routed through the fabric to the same hub switch. In this example, assume that CR1 is received prior to CR2. Accordingly, CR1 is processed first resulting in the generation and transmission of three commit requests ($CR1_1$, $CR1_2$, $CR1_3$). $CRL_1$ is transmitted to SM 1, $CR1_2$ is transmitted to SM 2, and $CR1_3$ is transmitted to SM 3. The hub switch then processes CR2 after CR1 has been processed. The result of processing CR 2 resulting in the generation and transmission of three commit requests ($CR2_1$, $CR2_2$, $CR2_3$). $CR2_1$ is transmitted to SM 1, $CR2_2$ is transmitted to SM 2, and $CR2_3$ is transmitted to SM 3. Because the hub tier switch processes CR1 and CR2 specific order, the resulting CRs issued from the hub tier switch to the storage modules are also issued in the same order (e.g., $CR1_1$ is issued to SM 1 before $CR2^1$ is issued to SM1). The order in which the CRs are issued to a given storage module also results in the CRs being received in this order and subsequently processed in this order.

At some later point in time, in Step 316, the fabric receives N commit replies. More specifically, because the fabric issued N write requests and N commit requests, N number of copies of the data will be written to the storage array. For each copy of the data written to the storage array, the fabric will receive a commit reply from a corresponding storage module (see e.g., FIG. 4A, step 410, and FIG. 4B, step 430). Each time a commit reply is received by the fabric it is transmitted to the client that issued the commit request. The fabric will continue to receive commit replies until it has received N commit replies (assuming that the commit requests were successfully processed by the individual storage modules).

FIG. 4A shows a method for writing data to the storage modules from the perspective of a storage module with a single global submission queue in accordance with one or more embodiments of the technology.

In Step 400, a unicast write request is received from the fabric (i.e., a write request issued by the fabric in Step 306).

In Step 402, the data associated with the write request is stored in a buffer of the storage module.

In Step 404, a unicast commit request is received from the fabric (i.e., a commit request issued by the fabric in Step 312).

In Step 406, the unicast commit request is placed in the single global submission queue. In one embodiment of the technology, the commit request includes or is otherwise associated with a client identifier. The client identifier is used in the generation and/or processing of the corresponding commit reply (see e.g., FIG. 4, step 410).

In Step 408, the commit requests in the global submission queue are processed based on a first-in first-out mechanism in order to preserve the processing order. The result of processing a commit request is the storing of data in the persistent storage. More specifically, consider a scenario in which the storage module received write request 1 (WR1) and subsequently commit request 1 (CR1). The result of processing CR1 is that data associated with WR1 is copied from the buffer in the storage module to a location in persistent storage.

In Step 410, a commit reply is generated and sent to the fabric. In one embodiment of the technology, the commit reply is generated based, as least in part, on the client identifier associated with the corresponding commit request.

In one embodiment of the technology, steps 400-406 are performed in parallel with steps 408-410. Specifically, steps 400-406 result in the population of the global submission queue while steps 408-410 result in the processing of commit requests in the global submission queue.

FIG. 4B shows a method for writing data to the storage modules from the perspective of a storage module with a per-client submission queue in accordance with one or more embodiments of the technology.

In Step 420, a unicast write request is received from the fabric (i.e., a write request issued by the fabric in Step 306).

In Step 422, the data associated with the write request is stored in the buffer of the storage module.

In Step 424, a unicast commit request is received from the fabric (i.e., a commit request issued by the fabric in Step 312).

In Step 426, the unicast commit request is placed in a per-client submission queue. In one embodiment of the technology, the commit request includes or is otherwise associated with a global sequencing tag. The global sequencing tags are used to maintain a global processing order of commit requests received by the storage module. The global sequencing tag may be added to (or otherwise associated with) the commit request by the storage module controller.

In Step 428, the commit requests in the per-client submission queues are processed based on the global sequencing tags in order to preserve the global processing order in the storage module. Said another way, the order in which the data is written to the persistent storage is dictated by the order in which the commit requests are processed and not by the order in which the write requests (and/or data) is received by the storage module. The result of processing a commit request is the storing of data in the persistent storage. More specifically, consider a scenario in which the storage module received write request 1 (WR1) and subsequently commit request 1 (CR1). The result of processing CR1 is that data associated with WR1 is copied from the buffer in the storage module to a location in persistent storage.

In Step 430, a commit reply is generated and sent to the fabric. In one embodiment of the technology, the commit reply is generated based, as least in part, on the client identifier associated with the per-client submission queue in which the commit request was stored.

In one embodiment of the technology, steps 420-426 are performed in parallel with steps 428-430. Specifically, steps 420-426 result in the population of the per-client submission queues while steps 428-430 result in the processing of commit requests in the per-client submission queues.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:
1. A method for processing write requests comprising:
   receiving, by a hub tier switch in a fabric from a first client, a first write request comprising a first data and a multicast address, wherein the hub tier switch is associated with the multicast address;

transmitting, by the hub tier switch and in response to the first write request, a second write request to a first storage module and a third write request to a second storage module;
receiving, by the hub tier switch from a second client, a fourth write request comprising a second data and the multicast address;
transmitting, by the hub tier switch and in response to the fourth write request, a fifth write request to the first storage module and a sixth write request to the second storage module;
receiving, by the hub tier switch, a first commit request originating from the first client and a second commit request originating from the second client, wherein the first commit request and the second commit request each comprise the multicast address, wherein the first commit request is associated with the first write request and the second commit request is associated with the fourth write request;
transmitting, by the hub tier switch to the first storage module, a third commit request associated with the first commit request and a fourth commit request associated with the second commit request;
transmitting, by the hub tier switch to the second storage module, a fifth commit request associated with the first commit request and a sixth commit request associated with the second commit request;
processing, by the first storage module, the third commit request and the fourth commit request, wherein the third commit request is processed before the fourth commit request based on a first global submission queue, wherein the first global submission queue organizes each commit request into a first chronological sequence based on when each commit request was received by the first storage module; and
processing, by the second storage module, the fifth commit request and the sixth commit request, wherein the fifth commit request is processed before the sixth commit request based on a second global submission queue, where the second global submission queue organizes each commit request into a second chronological sequence based on when each commit request was received by the second storage module.

2. The method of claim 1, further comprising:
receiving, after transmitting the third commit request, a first commit reply from the first storage module;
receiving, after transmitting fifth commit request, a second commit reply from the second storage module;
transmitting the first commit reply to the first client; and
transmitting the second commit reply to the first client.

3. The method of claim 1, wherein the fabric is a Peripheral Component Interconnect Express (PCIe) fabric.

4. The method of claim 1, wherein the first write request is received by a leaf tier switch in the fabric and transmitted, based on the multicast address, to the hub tier switch.

5. The method of claim 1, wherein the first storage module comprises phase change storage media.

6. The method of claim 1, wherein the third commit request is associated with a first client identifier specifying the first client and the fourth commit request is associated with a second client identifier specifying the second client.

7. The method of claim 1, wherein processing the third commit request and the fourth commit request comprises:
storing the third commit request in a first client submission queue associated with first client and storing the fourth commit request in a second client submission queue associated with the second client,
wherein the third commit request is associated with a first global sequencing tag and the fourth commit request is associated with a second global sequencing tag, and
wherein the first global sequencing tag and the second global sequencing tag are based on the first chronological sequence.

8. The method of claim 7,
wherein the third commit request and the fourth commit request are processed based on the first global sequencing tag and the second global sequencing tag,
wherein processing the third commit request comprises storing a copy of the first data in persistent storage in the first storage module.

9. A storage appliance, comprising:
a fabric;
a storage array operatively connected to the fabric and comprising a first storage module and a second storage module,
wherein the fabric is programmed to:
receive, by a hub tier switch in the fabric from a first client, a first write request comprising a first data and a multicast address, wherein the hub tier switch is associated with the multicast address;
transmit, by the hub tier switch and in response to the first write request, a second write request to the first storage module and a third write request to the second storage module;
receive, by the hub tier switch from a second client, a fourth write request comprising a second data and the multicast address;
transmit, by the hub tier switch and in response to the fourth write request, a fifth write request to the first storage module and a sixth write request to the second storage module;
receive, by the hub tier switch, a first commit request originating from the first client and a second commit request originating from the second client, wherein the first commit request and the second commit request each comprise the multicast address, wherein the first commit request is associated with the first write request and the second commit request is associated with the fourth write request;
transmit, by the hub tier switch to the first storage module, a third commit request associated with the first commit request and a fourth commit request associated with the second commit request;
transmit, by the hub tier switch to the second storage module, a fifth commit request associated with the first commit request and a sixth commit request associated with the second commit request;
wherein the first storage module is configured to process the third commit request and the fourth commit request, wherein the third commit request is processed before the fourth commit request based on a first global submission queue, wherein the first global submission queue that organizes each commit request into a first chronological sequence based on when each commit request was received by the first storage module; and
wherein the second storage module is configured to process the fifth commit request and the sixth commit request, wherein the fifth commit request is processed before the sixth commit request based on a second global submission queue, wherein the second global submission queue that organizes each commit request into a second chronological sequence based on when each commit request was received by the second storage module.

10. The storage appliance of claim 9,
wherein the first write request is received by a leaf tier switch in the fabric,
wherein the leaf tier switch transmits, based on the multicast address, the first write request to the hub tier switch.

11. The storage appliance of claim 9, wherein processing the third commit request and the fourth commit request comprises:
storing the third commit request in a first client submission queue associated with first client and storing the fourth commit request in a second client submission queue associated with the second client,
wherein the third commit request is associated with a first global sequencing tag and the fourth commit request is associated with a second global sequencing tag,
wherein the first global sequencing tag and the second global sequencing tag are based on the first chronological sequence,
wherein the third commit request and the fourth commit request are processed based on the first global sequencing tag and the second global sequencing tag,
wherein processing the third commit request comprises storing a copy of the first data in persistent storage in the first storage module.

12. The storage appliance of claim 9, wherein the fabric is a Peripheral Component Interconnect Express (PCIe) fabric.

\* \* \* \* \*